Figure 1:
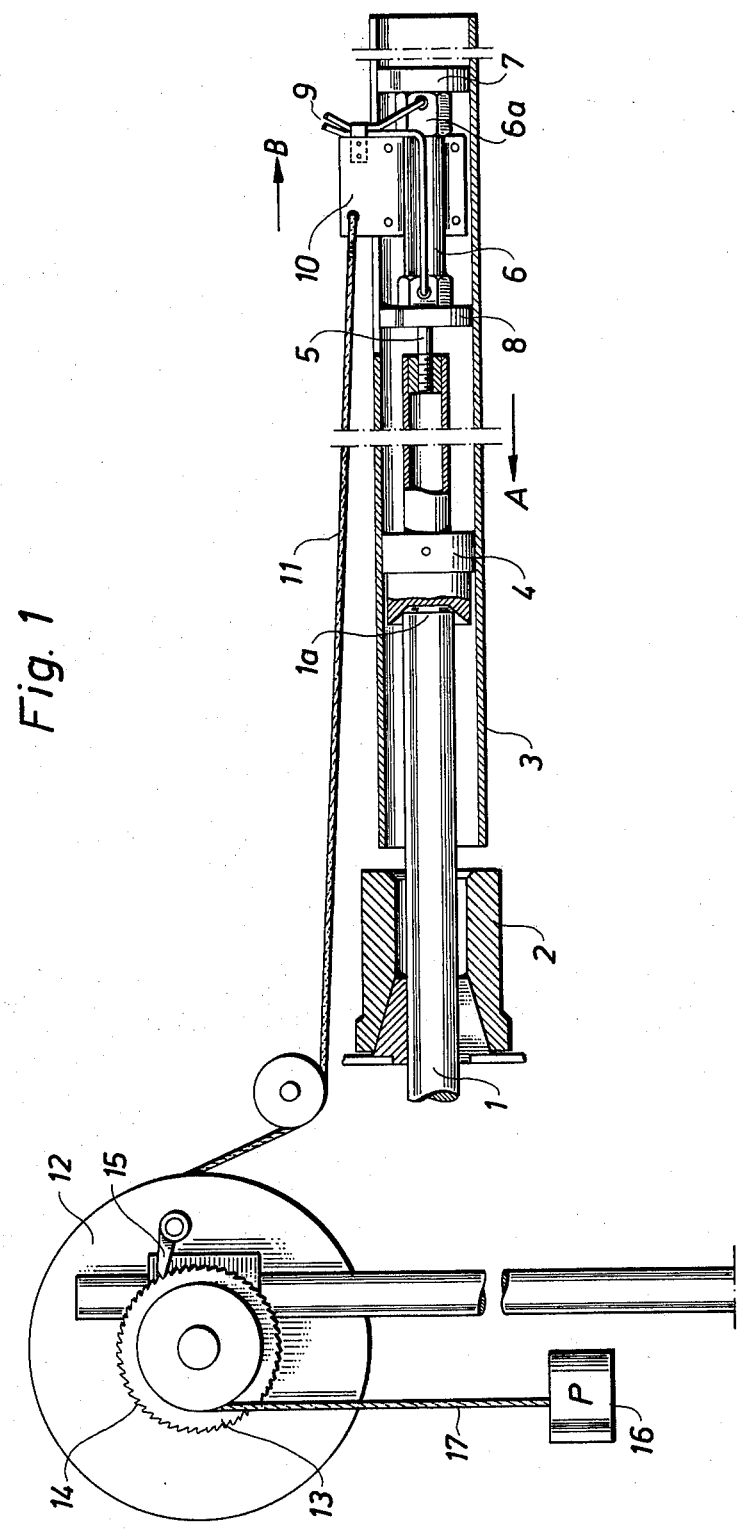

United States Patent [19]

Waage

[11] 4,090,423
[45] May 23, 1978

[54] WORKPIECE FEEDER ARRANGEMENT

[76] Inventor: Bard Meyer Waage, Rosenlund, S-741 00 Knivsta, Sweden

[21] Appl. No.: 697,235

[22] Filed: Jun. 17, 1976

[30] Foreign Application Priority Data

Jun. 18, 1975 Sweden ............................... 7507000
Jan. 20, 1976 Sweden ............................... 7600522

[51] Int. Cl.² .................... B23B 13/00; B23Q 5/22
[52] U.S. Cl. ........................................ 82/2.5; 214/1.4
[58] Field of Search ............... 82/2.5, 2.7; 214/1.1, 214/1.4

[56] References Cited

U.S. PATENT DOCUMENTS 2,626,450  1/1953  Gridley ............................. 214/1.4

Primary Examiner—Harrison L. Hinson
Attorney, Agent, or Firm—Brumbaugh, Graves, Donohue & Raymond

[57] ABSTRACT

A feeder arrangement for intermittently feeding forward a workpiece for machining in an automatic machine tool such as a lathe.

The workpiece, such as bar stock, is disposed in a tubular member and is intermittently fed forward to a lockable clamping member when loosened. The feeder arrangement includes a feeder device which is operable by a pressure fluid medium to feed forward the workpiece while itself is prevented from movement relative to the tubular member by an arresting member and, once the workpiece has been clamped, the feeder device is advanced to juxtapose it with the end of the workpiece.

4 Claims, 4 Drawing Figures

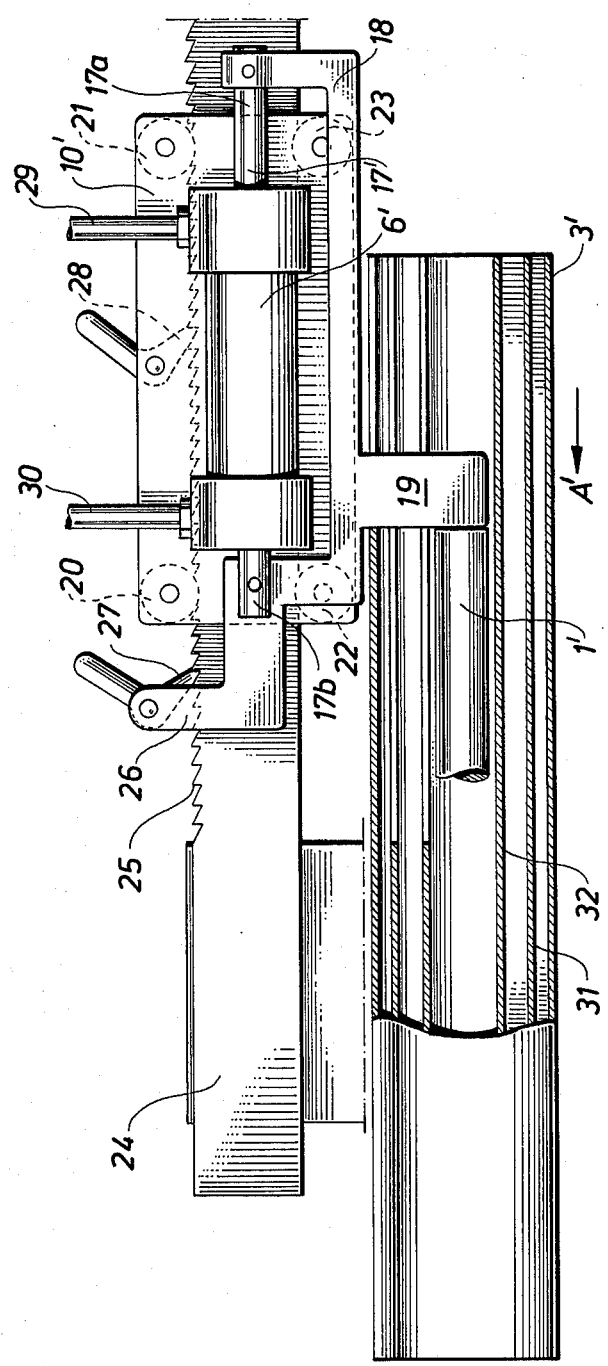

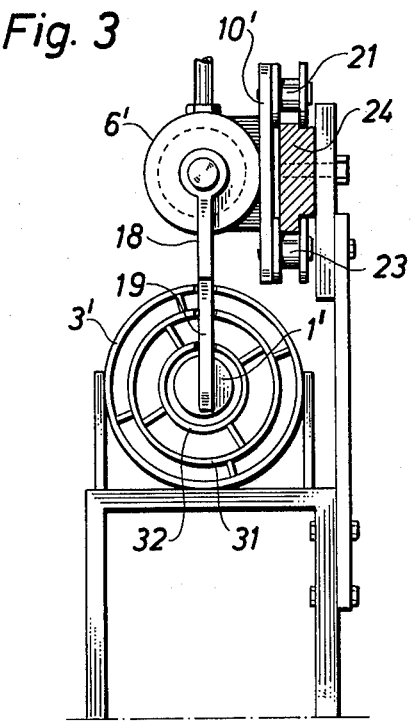
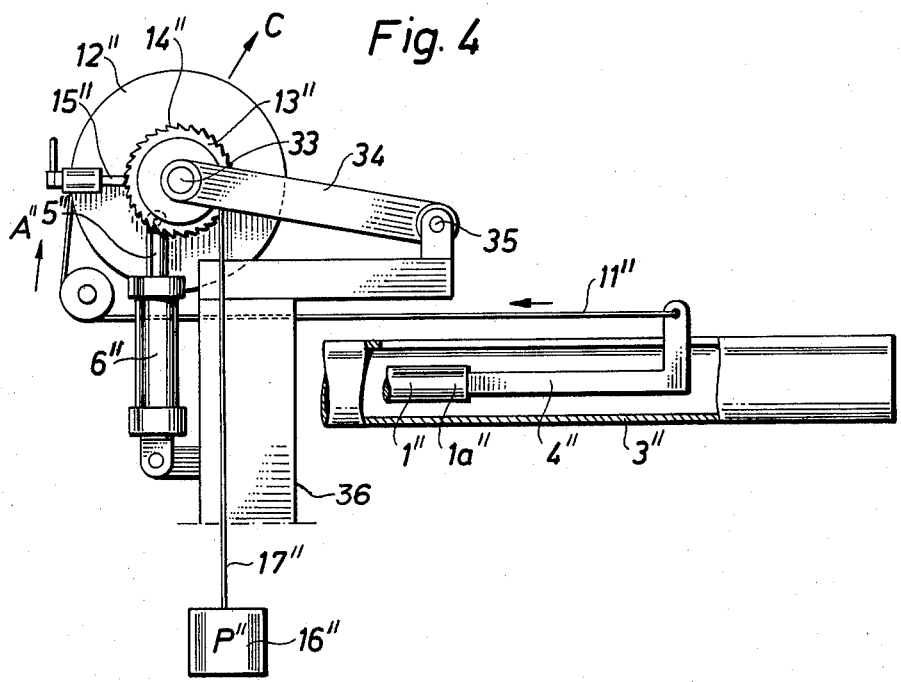

WORKPIECE FEEDER ARRANGEMENT

The present invention relates to a feeder arrangement for intermittently feeding forward a workpiece for machining in an automatic turret or slide lathe or similar machine. Feeders known hitherto for this purpose operate primarily by pressure-feeding the workpiece. In principle the workpiece is thus permanently under pressure, that is to say even during the actual machining process. Although a lockable clamping member, for example, a chuck clamps the workpiece between movements, there is always a latent pressure on the workpiece which causes problems such as unnecessary friction, and heating due to friction. Furthermore, there is always the risk that the object to be machined may be unintentionally pressed out of a sleeve containing the workpiece in an uncontrollable manner when the clamping member is opened or that the object may be displaced from the supposedly clamped position in the clamping member during the machining stage due to tolerances existing in the machine being taken-up.

Preferably the workpiece to be machined should be pressure-loaded substantially only during its actual displacement, in the clamping and then only in a controlled manner.

According to the present invention there is provided a feeder arrangement for intermittently feeding forward a workpiece for machining in a machine tool, comprising a tubular member in which a workpiece is carried during its intermittent feeding to a stationary, releasable clamping member of a machine tool for securing the workpiece in position for machining, a feeder device opertively coupled to a workpiece in the tubular member and being operable by a pressure fluid medium, and at least one arresting member for preventing relative movement between the tubular member and the feeder device during the actual forward movement of the workpiece.

In one embodiment of the invention the feeder device comprises a pneumatically driven cylinder, the piston rod is arranged to cooperate with the workpiece to effect displacement of this in the sleeve. The feeder device is suitably displaceable in the sleeve and the arresting member may consist of a cable arranged in cooperation with a blocking device to maintain the feeder device substantially stationary during forward movement of the workpiece in the sleeve. The blocking device used for this purpose is suitably weighted and arranged via the cable to move the feeder device along in the sleeve after each movement of the workpiece, i.e. when the piston in the cylinder has returned to its original position. An advantage of this is that the weight is not used to move the workpiece along in the sleeve but only to move the feeder along after each displacement of the workpiece. The weight can therefore be dimensioned accordingly.

In another embodiment of the invention the feeder device comprises a double-action, pneumatically controlled cylinder with a piston rod extending through the cylinder. The two ends of the piston are secured in a frame member having an arm protruding into the sleeve. The cylinder housing is secured in a bed-plate slidable on a guide rail having ratchet teeth thereon. The bed-plate has a first pawl arranged to cooperate with the teeth on the guide rail to secure the bed-plate during the feeding movement of the workpiece by the forward movement of the piston-rod and a second pawl on the frame member is arranged to secure the frame member during the return movement of the piston rod which causes the bed-plate to be moved forward to its new starting position.

In a further embodiment of the invention the feeder device is arranged outside the sleeve itself, in which case it is arranged to influence the workpiece by way of a suitable movement transfer mechanism. This offers considerable advantages in installing the feeder arrangement in accordance with the invention, particularly if this is to be fitted on already existing machinery. In this embodiment the feeder device is outside the sleeve and is arranged, via a movement-transfer mechanism, to influence a displaceable support member in the sleeve. The support member is preferably connected to one end of a cable, the other end of which may be wound into a drum, the drum in order to move the workpiece forward being arranged to be displaced by the action of the feeder device and upon its return to normal position being arranged to position the support member in the position to which it has been moved in the sleeve by winding up the cable.

The present invention also relates to an automatic machine comprising the feeder arrangement. Embodiments of the present invention will now be described, by way of example with reference to the accompanying drawings, in which like reference numerals refer to corresponding parts in the respective embodiments and in which:

FIG. 1 is a diagrammatic view, partly in section, of a first embodiment of the invention, FIG. 2 is a diagrammatic view partly in section of a second embodiment of the invention, FIG. 3 is an end view of the embodiment shown in FIG. 2, and FIG. 4 is a diagrammatic view partly in section, of a third embodiment of the invention.

A circular cross-section material blank or workpiece for machining is held in a lockable clamping member 2, such as a chuck or some other stationary clamping means which is designed to be opened when the blank 1 to be machined is to be pushed forward towards a machining station, not shown in detail, and is thereafter lockable to secure the workpiece 1 in its new position. The opposite end 1a of the workpiece 1 protrudes into a tubular feeding sleeve 3 and normally rests against a supporting member 4 axially displaceable in the sleeve 3. The supporting member 4 cooperates in turn with a pneumatically driven piston 5 moved to and fro in a double acting cylinder 6 of a feeder device arranged in the sleeve 3, the feeder device being guided in the sleeve by guide means 7, 8. An inlet 9 for the pressure medium effects the forward and return movements of the piston 5 in the cylinder 6. A bed-plate 10 attached to the cylinder 6 has an end protruding through a slot in the sleeve 3. A cable 11 is connected at one end to the end of the plate 10 protruding from the sleeve 3 to a ratchet and feeding means by a cable 11. The other end of the cable 11 is wound onto a drum 12 which is provided with a ratchet wheel 13 having teeth 14 to cooperate with a pawl 15. The ratchet wheel 13 is weighted by a weight 16 on a cable 17. The feeder arrangement shown in FIG. 1 functions in the following manner; when the workpiece 1 is to be moved forward, the clamping member 2 is opened first, whereafter pressure medium is introduced in a rear chamber 6a of the cylinder 6 through the inlet 9 so that the piston rod 5 is displaced in the direction of the arrow A and the supporting member 4 thus pushes the workpiece 1 along a predetermined distance. The cylinder 6 is maintained stationary during this movement of the piston 5 by the pawl 15 engaging the tooth 14 of the rachet wheel thus preventing the cable 11 from being unwound from drum 12 thus preventing any backward movement of the plate 10 and thereby the cylinder 6 in the direction of the arrow B. As soon as the forward movement of the workpiece 1 has terminated, the clamping member 2 is again locked, whereupon the admission of the pressure medium in the cylinder 6 is reversed so that the piston 5 is returned to its initial position. At the same time the necessary forward movement of the plate 10 and thereby the cylinder 6 is achieved in the direction of the arrow A, and thus also the abutment of the supporting member 4 against the rear end 1a of the workpiece 1 which has now been moved forward; the plate 10 having been moved in the direction of the arrow A by means of the cable 11 being wound-up on the drum 12 by the weight 16 urging the drum 12 in the anti-clockwise direction in FIG. 1. The weight 16 need only be dimensioned to urge the displacement of the plate 10 and the cylinder 6 in the sleeve 3, for which no great force is required.

The cable 11 thus serves two purposes: it retains the plate 10 and thus the feeder device in position during the work cycle of the cylinder and also moves the plate 10 forward to a new working position after the workpiece 1 has been displaced.

An alternative embodiment of the invention is shown in FIGS. 2 and 3. In principle a pneumatically controlled displacement is utilized here instead of the blocking and feeding means shown in FIG. 1 for the cylinder attachment 10. This embodiment also includes a sleeve 3' carrying a workpiece 1', the front end of the sleeve being designed to cooperate with a clamping member, not shown here.

According to this embodiment the actual feeder device also comprises a double-acting piston and cylinder arrangement 6' controlled by pressure medium and having a piston rod 17' extending therethrough. The ends of the piston rod 17a, 17b are firmly attached to a frame member 18 provided with an arm 19 protruding into the sleeve 3' intended to effect displacement of the workpiece 1' in the direction of the arrow A'. The cylinder 6' is secured on a bed-plate 10' attached to the cylinder 6' and the plate is arranged by means of four rollers 20, 21, 22, 23 to run along a guide rail 24 with ratchet teeth 25 on the upper surface, located above the sleeve 3'. The frame member 18 is provided with an upstanding arm 26 projecting in the direction of the guide rail 24. A pawl 27 arranged to cooperate with the teeth 25 is pivotally mounted on the arm 26. Another pawl 28 cooperating with the ratchet teeth 25 is pivotally mounted in the bed-plate 10'. The cylinder 6' has inlets 29 and 30 for pressure medium to the cylinder 6'. Concentric insert sleeves 31 and 32 are provided in the sleeve 3'.

The means shown in FIGS. 2 and 3 functions in the following manner:

The workpiece forward-feed cycle comprises supplying the cylinder 6' with a pressure medium through the inlet 29, the pawl 28 is engaged with the teeth 25 and thus maintains the bed-plate 10' in position while the piston rod 17 is displaced in the direction of the arrow A'. The frame member 18 with its arm 19 is also moved in the direction of the arrow A' so that the workpiece 1' is moved forward in the sleeve 3'. Upon completion of the forward stroke of the piston 17 the pawl 27 is brought into engagement with the teeth 25 and the frame member 18 is thus retained in its forward position. During the subsequent return of the piston rod to its original position the bed-plate 10' will now be forced forward in the direction of the arrow A' and is then locked in this position by the pawl 28 engaging the teeth 25. The apparatus is now moved forward and once again ready for a new work cycle.

FIG. 4 shows a third embodiment of the invention. The front end, not shown, of the workpiece 1" which has a circular cross-section, is arranged in the same manner as above in a lockable clamping member, not shown, such as a chuck or some other stationary clamping means which can be opened when the workpiece 1" to be machined is to be moved forward towards a machining station, not shown in detail, and thereafter to lock or secure the workpiece 1" in its new position. The opposite end 1a" of the workpiece 1" projects into a feeder sleeve 3" and normally rests against a supporting member 4" axially displaceable in the sleeve. The supporting member 4" cooperates in turn by way of a movement-transfer mechanism described in more detail below, with a piston moved to and fro in a pneumatically driven cylinder 6" of a feeder device arranged outside the sleeve 3". The end of the supporting member 4" projecting out of the sleeve 3" is connected by a cable 11" to a blocking and feeding means. One end of the cable 11" is thus secured in the supporting member 4" and the opposite end is wound onto a drum 12". The drum 12" is provided with a ratchet wheel 13" provided externally with teeth 14" arranged to cooperate with a pawl 15". The ratchet wheel 13" is weighted by a weight 16" on a cable 17". The cylinder 6" is secured in the stand 36 and the front end of the piston rod 5" is firmly attached to the drum 12". The drum 12" is rotatably journalled about a central shaft 33 which also carries the end of a lever 34, the opposite end of which lever is pivotably journalled on the stand 36 so that the drum 12" can be lifted by the piston rod 5" in the direction of the arrow C about the joint 33 of the lever 34 and returned to the normal position as shown when the piston rod has returned to its original position. The means shown functions in the following manner; when the workpiece 1" is to be moved forward the clamping member, not shown, is opened first, after which a pressure medium is supplied to the cylinder 6" so that the piston rod 5" is moved up in the direction of the arrow A", whereupon the supporting member 4" drawn by the cable 11" will push the workpiece 1" a predetermined distance along the sleeve 3". The cable 11" is prevented from being unwound by the pawl 15" engaging a tooth 14" of the ratchet wheel 13". The clampimg member is then retightened to clamp the workpiece 1". When the piston rod 5" returns to its original position, the drum will also return to its original position and the slack cable 12" will be wound up onto the drum via the weighted cable 17" so that the supporting member 4" is again positioned in the sleeve 3 until the next occasion when it is to be moved forward.

The invention is not limited to the embodiments shown in the drawings and described above but can be varied in many ways within the scope of the appended claims.

I claim:

1. A feeder arrangement for intermittently feeding forward a workpiece for machining in a machine tool comprising, in combination:

(a) a guide member in which the workpiece is carried during its intermittent movement toward a stationary, releasable clamping member of the machine tool;
(b) a supporting member displaceably arranged in the guide member for moving the workpiece forward;
(c) a lever arm mounted for pivotal movement, one end of the lever arm being pivotally journalled to a stationary stand;
(d) a rotatable drum including a shaft therethrough supported at an end of the shaft by the other end of the lever arm;
(e) linkage means including a cable connected at an end thereof to the supporting member and wound at the other end thereof about the rotatable drum;
(f) a feeder device for pivotally displacing the drum supported on the lever arm between an initial position and a displaced position; and
(g) arresting means for holding the drum rotationally fixed during displacement of the drum to the displaced position, wherein displacement of the drum results in movement of the supporting member to move the workpiece forward, said drum being rotatable to wind up the cable on return of the drum to its initial position in order to maintain the supporting member in the position to which it has been moved.

2. The feeder arrangement described in claim 1 wherein the feeder device is operable by a pressure fluid medium.

3. The feeder arrangement described in claim 1 wherein the arresting means includes a ratchet wheel fixed on the drum and a pawl engageable with the ratchet wheel.

4. The feeder arrangement described in claim 3 further comprising a second cable connected to the ratchet wheel and a weight suspended from the second cable for biasingly weighting the ratchet wheel.

* * * * *